(12) United States Patent
Buckler et al.

(10) Patent No.: US 7,996,706 B2
(45) Date of Patent: *Aug. 9, 2011

(54) SYSTEM TO RECOVER A FAILED FLASH OF A BLADE SERVICE PROCESSOR IN A SERVER CHASSIS

(75) Inventors: Gerhard Nikolaus Buckler, Apex, NC (US); Jeffery Michael Franke, Apex, NC (US); Donald Eugene Johnson, Apex, NC (US); Carl A. Morrell, Cary, NC (US); David Robert Woodham, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 860 days.

This patent is subject to a terminal disclaimer.

(21) Appl. No.: 12/024,816

(22) Filed: Feb. 1, 2008

(65) Prior Publication Data

US 2008/0141236 A1    Jun. 12, 2008

Related U.S. Application Data

(63) Continuation of application No. 10/777,375, filed on Feb. 12, 2004, now Pat. No. 7,383,461.

(51) Int. Cl.
*G06F 11/00* (2006.01)
(52) U.S. Cl. ............................................. 714/2; 714/23
(58) Field of Classification Search ................ 714/2, 15, 714/16, 4.1, 23; 709/238, 239; 717/168, 717/178
See application file for complete search history.

(56) References Cited

U.S. PATENT DOCUMENTS

| | | | |
|---|---|---|---|
| 5,864,653 A | 1/1999 | Tavallaei et al. | |
| 6,338,150 B1 | 1/2002 | Johnson et al. | |
| 7,062,575 B2 | 6/2006 | Garnett et al. | |
| 7,174,375 B2 | 2/2007 | King et al. | |
| 7,233,877 B2 | 6/2007 | King et al. | |
| 7,299,277 B1 | 11/2007 | Moran et al. | |
| 7,383,461 B2 | 6/2008 | Buckler et al. | |
| 7,395,323 B2 | 7/2008 | Larson et al. | |
| 7,398,401 B2 | 7/2008 | Goud et al. | |

(Continued)

FOREIGN PATENT DOCUMENTS

JP    S63191240    8/1988

(Continued)

OTHER PUBLICATIONS

U.S. Appl. No. 12/024,824, Notice of Allowance, Feb. 18, 2011.

(Continued)

*Primary Examiner* — Dieu-Minh Le
(74) *Attorney, Agent, or Firm* — Cynthia G. Seal; Law Office of Jim Boice

(57) ABSTRACT

A system for recovering a server blade, in a multiple server blade computer, that is lost during a flash update operation on a service processor in the server blade. Because of the flash update failure, the lost server blade is unaware of its location on a management pathway, which in an exemplary form may be a midplane or a bus, which connects the server blade and a management module in a server blade chassis. The lost server blade puts a signal on the management pathway indicating that the flash failed. The signal is put on a special channel reserved for such messages. The management module receives the signal, and then determines which of the multiple server blades are lost due to the flash update failure.

3 Claims, 5 Drawing Sheets

U.S. PATENT DOCUMENTS

| | | |
|---|---|---|
| 7,483,374 B2 * | 1/2009 | Nilakantan et al. ............ 370/235 |
| 7,577,778 B2 | 8/2009 | Ni et al. |
| 2002/0087668 A1 | 7/2002 | San Martin et al. |
| 2002/0188718 A1 | 12/2002 | McGraw et al. |
| 2003/0069953 A1 | 4/2003 | Bottom et al. |
| 2003/0163555 A1 | 8/2003 | Battou et al. |
| 2003/0226004 A1 | 12/2003 | Abbondanzio et al. |
| 2004/0030766 A1 | 2/2004 | Witkowski |
| 2004/0073712 A1 | 4/2004 | Larson et al. |
| 2004/0098532 A1 | 5/2004 | Huang et al. |
| 2004/0103180 A1 | 5/2004 | Brown et al. |
| 2004/0117536 A1 | 6/2004 | Franke et al. |
| 2004/0153710 A1 | 8/2004 | Fair |
| 2004/0255191 A1 | 12/2004 | Fox et al. |
| 2005/0021732 A1 | 1/2005 | Suffern et al. |
| 2005/0068888 A1 * | 3/2005 | Komarla et al. .............. 370/216 |
| 2005/0091396 A1 | 4/2005 | Nilakantan et al. |
| 2005/0188080 A1 | 8/2005 | Motsinger et al. |
| 2005/0188221 A1 | 8/2005 | Motsinger et al. |
| 2005/0216627 A1 | 9/2005 | Goud et al. |
| 2007/0094426 A1 | 4/2007 | Chiang et al. |
| 2010/0107015 A1 | 4/2010 | Bernabeu-Audan et al. |

FOREIGN PATENT DOCUMENTS

| | | |
|---|---|---|
| JP | S63288355 | 11/1988 |
| WO | 03014950 A2 | 2/2003 |

OTHER PUBLICATIONS

U.S. Appl. No. 12/024,836, First Response, Dec. 17, 2010.
U.S. Appl. No. 12/024,836, Final Office Action, Feb. 28, 2011.
U.S. Appl. No. 12/024,824, Non-Final Office Action, Oct. 7, 2010.
U.S. Appl. No. 12/024,824, First Response, Jan. 3, 2011.
U.S. Appl. No. 12/024,836, Non-Final Office Action, Jul. 21, 2010.

* cited by examiner

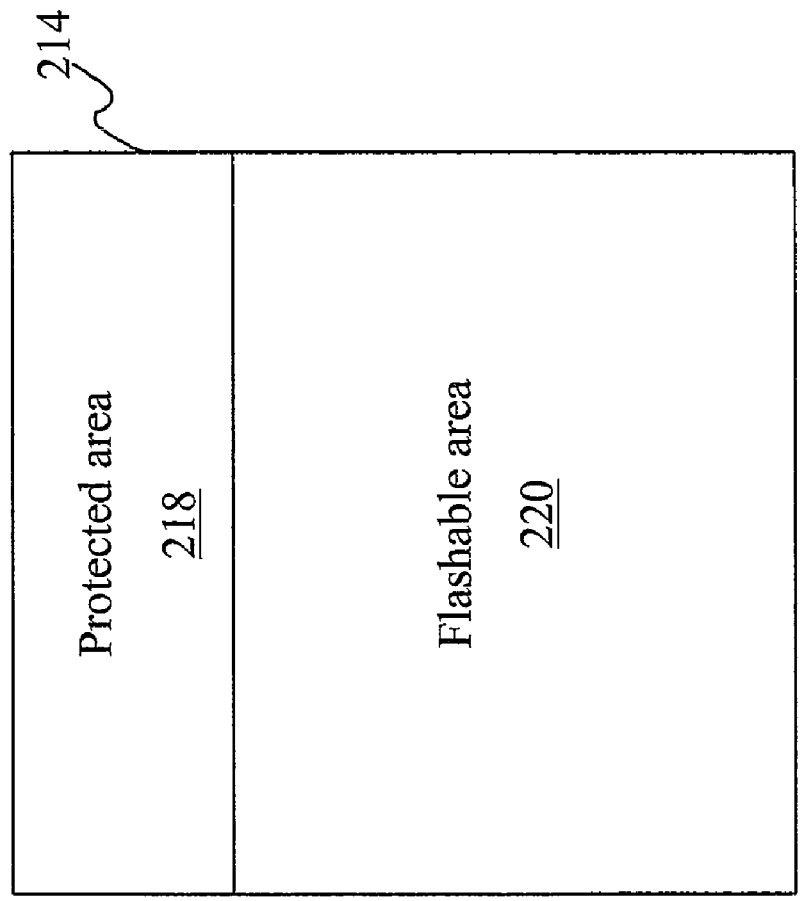

SYSTEM TO RECOVER A FAILED FLASH OF A BLADE SERVICE PROCESSOR IN A SERVER CHASSIS

The present application is a continuation of U.S. patent application Ser. No. 10/777,375, filed on Feb. 12, 2004, and entitled, "Method and System to Recover a Failed Flash of a Blade Service Processor in a Server Chassis," which is incorporated herein by reference.

BACKGROUND OF THE INVENTION

1. Technical Field

The present invention relates in general to the field of computers, and in particular to multiple blade servers housed in a server chassis. Still more particularly, the present invention relates to a method and system for automatically recovering a failed flash of a blade service processor.

2. Description of the Related Art

Server blade computers offer high-density server boards (blades) in a single chassis (blade chassis). A typical server blade computer is illustrated in FIG. 1, identified as server blade chassis 102. Server blade chassis 102 includes multiple hot-swappable server blades 104a-n. There are typically fourteen server blades 104 in server blade chassis 102. The operations of server blades 104 are coordinated by logic identified as a management module 108, which typically includes a processor for controlling input/output (I/O) functions, interfacing with a network 106 (such as the Internet or a Local Area Network), and allocating jobs and data to the different server blades 104.

Another function of management module 108 is to program Flash Read Only Memory (Flash Memory) in server blades 104. This flash operation updates firmware in the server blade 104, resulting in optimized operation. However, since server blades 104 are hot-swappable, there is usually nothing to prevent an engineer from unwittingly removing a server blade 104 from a mid-plane or back-plane (not shown) of server blade chassis 102 while the server blade 104 is in the middle of a flashing operation, which can take several minutes. When the partially flashed server blade 104 is re-installed into server blade chassis 102 or another chassis, it will often malfunction. Upon being re-installed into server blade chassis 102, self-diagnostic logic in the re-installed server blade 104 will recognize that the flash operation failed to fully execute. However, the server blade 104 will often be crippled to the point of not knowing its bus address or physical location within server blade chassis 102, and thus unable to advise management module 108 of the problem with the aborted flash.

Similarly, even if server blade 104 is not removed from server blade chassis 102, but the flashing operation fails, management module 108 will likely not know of the failure. Again, server blade 104 will be unable to notify management module 108 of the problem.

What is needed, therefore, is a system for enabling a server blade to communicate with a management module in a server blade chassis after a failed flash operation, which resulted in the server blade not knowing its location in the server blade chassis.

SUMMARY OF THE INVENTION

The present invention is directed to a system for recovering a server blade, in a multiple server blade computer, that is lost during a flash update operation on a service processor in the server blade. Because of the flash update failure, the lost server blade is unaware of its location on a management pathway, which in an exemplary form may be a midplane or a bus, which connects the server blade and a management module in a server blade chassis. The lost server blade puts a signal on the management pathway indicating that the flash failed. The signal is put on a special channel reserved for such messages. The management module receives the signal, and then determines which of the multiple server blades are lost due to the flash update failure.

In the event of multiple flash update failures occurring contemporaneously, the management module blocks communication with all lost server blades except one, and re-flashes the one unblocked server blade, thus enabling that one unblocked server blade to define its location (address) on the management pathway. Each of the other lost server blades are sequentially unblocked, re-flashed, and thus enabled to define their locations on the management pathway.

The above, as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, farther purposes and advantages thereof, will best be understood by reference to the following detailed description of an illustrative embodiment when read in conjunction with the accompanying drawings, where:

FIG. 2b depicts an organization of a non-volatile memory in a service processor in one of the service blades;

DETAILED DESCRIPTION OF A PREFERRED EMBODIMENT

Figure 2A:
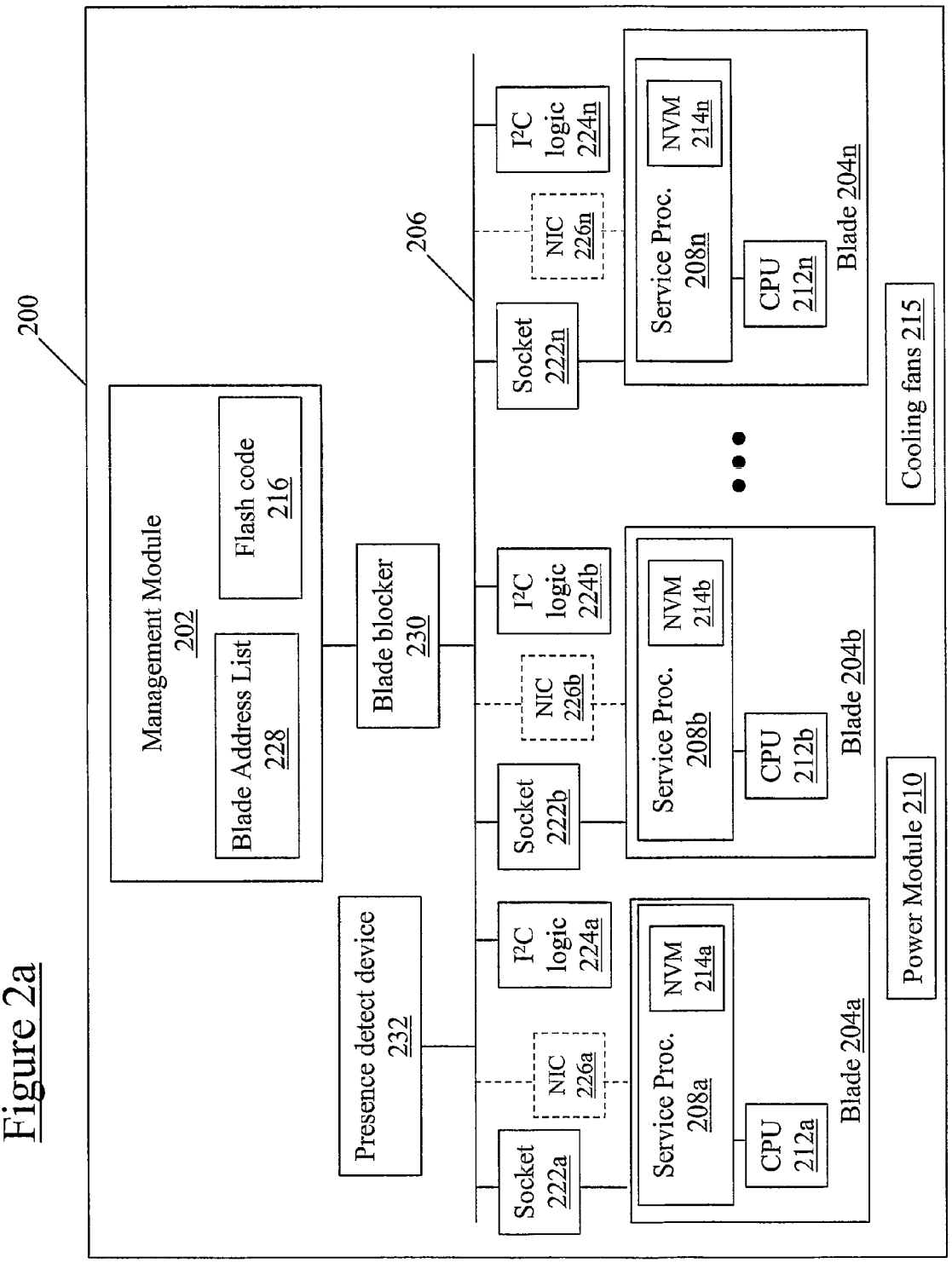
FIG. 2a illustrates a blade chassis incorporating a blade blocker associated with a management module for isolating and locating a server blade that is lost due to a flash failure.

With reference now to FIG. 2a, there is depicted a schematic block diagram of a server blade chassis 200 according to a preferred embodiment of the present invention. For the sake of clarity, only one management module 202 and three server blades 204a-n are depicted. However, in a preferred embodiment, a backup management module 202 (not shown) is incorporated into server blade chassis 200, and server blade chassis 200 has a midplane 206 capable of connecting fourteen or more server blades 204.

Management module 202 is a logic capable of managing multiple server blades 204. Management module 202 is coupled to server blades 204a-n via a management pathway identified as midplane 206. Midplane 206 is a backplane, mounted in the middle of server blade chassis 200, that contains circuitry and sockets into which additional electronic devices or cards, including server blades 204 can be plugged. Midplane 206 contains at least one bus for secure internal communication between management module 202 and server blades 204a-n, as well as between and among server blades 204a-n themselves, via respective service processors 208a-n.

Management module 202 is capable of detecting the presence, quantity, type and revision level of each server blade 204, power module 210, and midplane 206 in the system. Management module 202 can also direct flashing operations and identify failures of flashing operations, as described further below.

Each server blade 204 has at least one central processing unit (CPU) 212, and a non-volatile memory (NVM) 214. Preferably, NVM 214 is a Flash Read Only Memory ("Flash ROM" or "Flash Memory"), which can be erased and reprogrammed in units of memory called blocks. NVM 214 may also include non-volatile Electrically Erasable Programmable Read Only Memory (EEPROM), which is similar to Flash Memory except that EEPROM is erased and rewritten at the byte level, and is usually smaller in capacity than the flash memory.

When a server blade 204 is shipped from a manufacturer, the NVM 214 is typically pre-burned with firmware, including a Basic Input/Output System (BIOS) as well as software for monitoring the server blade 204. Such monitoring may include regulating operating temperatures via speed adjustments to cooling fans 215, controlling Direct Access Storage Devices (DASD's), monitoring and controlling voltages throughout the system, determining the power-on status of the server blade 204, requesting access to a shared keyboard, video, mouse, Compact Disk-Read Only Memory (CD-ROM) and/or floppy disk drives, as well as monitoring the Operating System (OS) running on the server blade 204. In order to take advantage of updates and other optimizations, this firmware is periodically updated by management module 202, which re-flashes the firmware updates into NVM 214.

For example, an updated flash code 216 accessible to (although not necessarily within) management module 202 can be downloaded to any or all service processors 208. Each service processor 208 controls the flashing of the flash code 216 into its respective associated NVM 214. If the flashing of flash code 216 into NVM 214 fails, then management of server blade 204 may be lost.

For example, consider the following example of a failed flashing operation of updated flash code 216 into NVM 214a. During the flashing operation, server blade 204a may be physically removed from its slot before the flashing operation completes. Likewise, there may be an intermittent power failure or spike during the flashing, or there may simply be a control, timing or any other software or hardware error that causes the flashing to fail to complete. Such a failure may result in server blade 204a's service processor 208a "forgetting" its address on midplane 206, and thus the address of server blade 204a, as described below.

With reference now to FIG. 2b, NVM 214 is divided into two sections: a protected area 218 and a flashable area 220. Stored within protected area 218 is non-erasable (not capable of being overwritten) code, which may comprise Vital Product Data (VPD) such as the serial number, model number and Universal Unique IDentifier (UUID) of the server blade 204 associated with that NVM 214. Protected area 218 may also include tracking data, including which other server blade chassis 200 the server blade 204 has been mounted to in the past, if any. However, protected area 218 does not include the current address ("management pathway identity") of the server blade 204 on management pathway illustrated as midplane 206.

Midplane 206 contains sockets 222 into which server blades 204 can be plugged. When a server blade 204 is plugged into a specific socket 222, a physical address is established for that server blade 204. For example, consider server blade 204a being plugged into socket 222a. A control logic, depicted as $I^2C$ logic 224a, which is compliant with the Phillips' Inter-IC (Integrated Circuit) standard (incorporated by reference in its entirety herein and commonly referred to as "$I^2C$"), detects the presence of server blade 204a in socket 222a. $I^2C$ logic 224a, operating in conjunction with management module 202, assigns a physical address on a bus in midplane 206 to server blade 204a when server blade 204a is plugged into socket 222a. Preferably, each server blade 204 is associated with a unique $I^2C$ logic 224, which is preferably connected to midplane 206 as depicted in FIG. 2a. Alternatively, a single $I^2C$ logic 224 can be used by all server blades 204.

Figure 1:
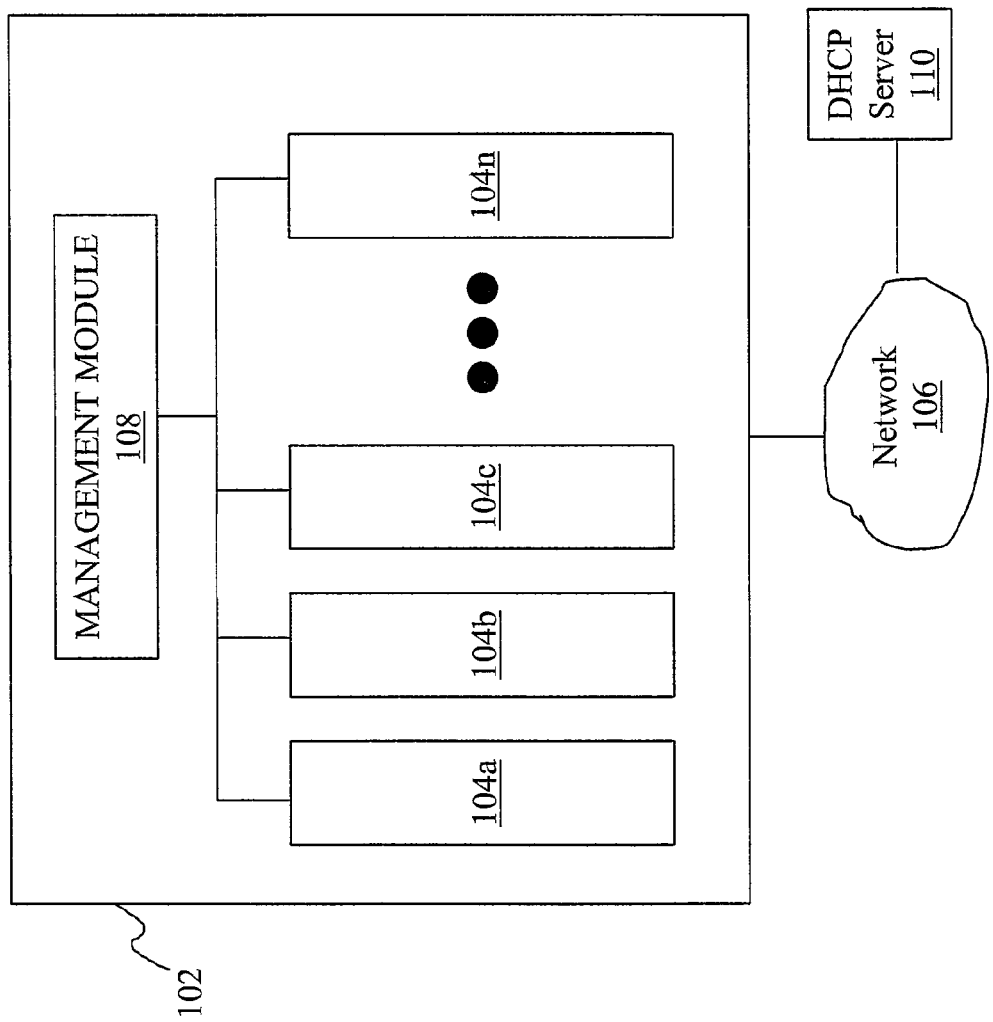
FIG. 1 depicts a prior art diagram of a server blade chassis coupled to a network.

Alternatively, each socket blade 204 may have a unique Internet Protocol (IP) address on midplane 206. That is, midplane 206 may support intercommunication using IP addressing protocol, in which each device connected or coupled to midplane 206 contains an IP address assigned by logic (not shown) that is either within or outside server blade chassis 200. For example, a Dynamic Host Configuration Protocol (DHCP) server 110, as shown in FIG. 1, may be used to assign an IP address to server blade 204a. Communication with server blade 204a is thereafter via a Network Interface Card (NIC) 226a that is associated with server blade 204a.

Management module 202 manages a blade address list 228, which is a list of all management pathway locations (either a physical bus address if socket 222 is used or an IP address if NIC 226 is used) on midplane 206. This blade address list 228 is used to identify a lost server blade 204 in steps described in FIGS. 3 and 4.

With reference again to FIG. 2a, situated, in an exemplary manner, between management module 202 and midplane 206 is a blade blocker 230, which selectively blocks communication between management module 202 and any combination of specified service processors 208 in server blades 204. A default state of blade blocker 230 allows unrestricted communication between management module 202 and server blades 204 (via respective service processors 208), with specific communication between management module 202 and server blades 204 being blocked upon a signal/command from management module 202. Blade blocker 230 is used to isolate a specific server blade's 204 service processor 208 when multiple server blades' 204 service processors 208 are lost, as described in FIG. 4.

Also associated with midplane 206 is a presence detect device 232. Presence detect device 232, which may be an $I^2C$ device, is able to communicate with management module 202 to identify which server blades 204 are installed on the midplane 206.

Figure 3:
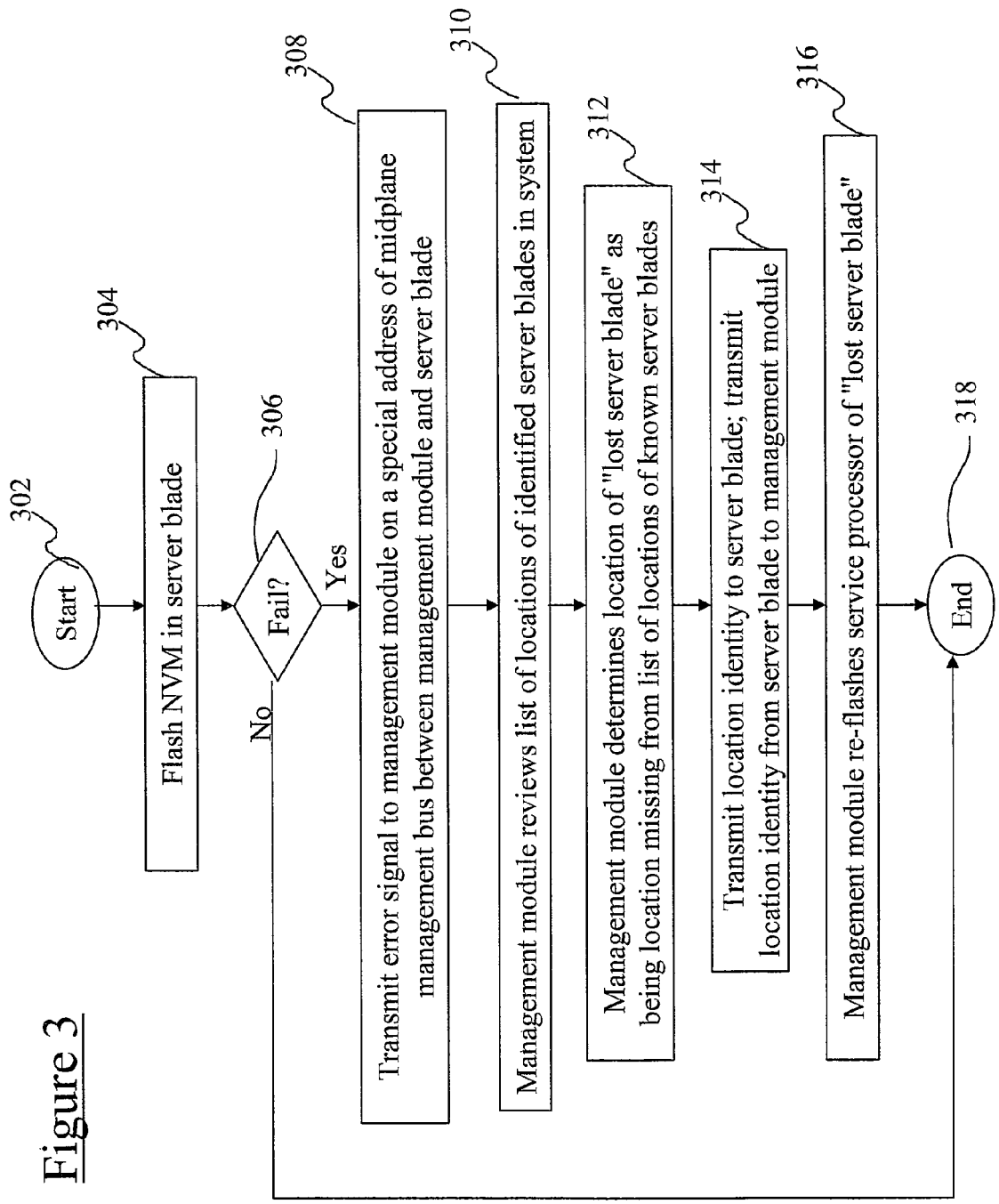
FIG. 3 is a flow-chart of steps taken to retrieve a single lost server blade.
Figure 4:
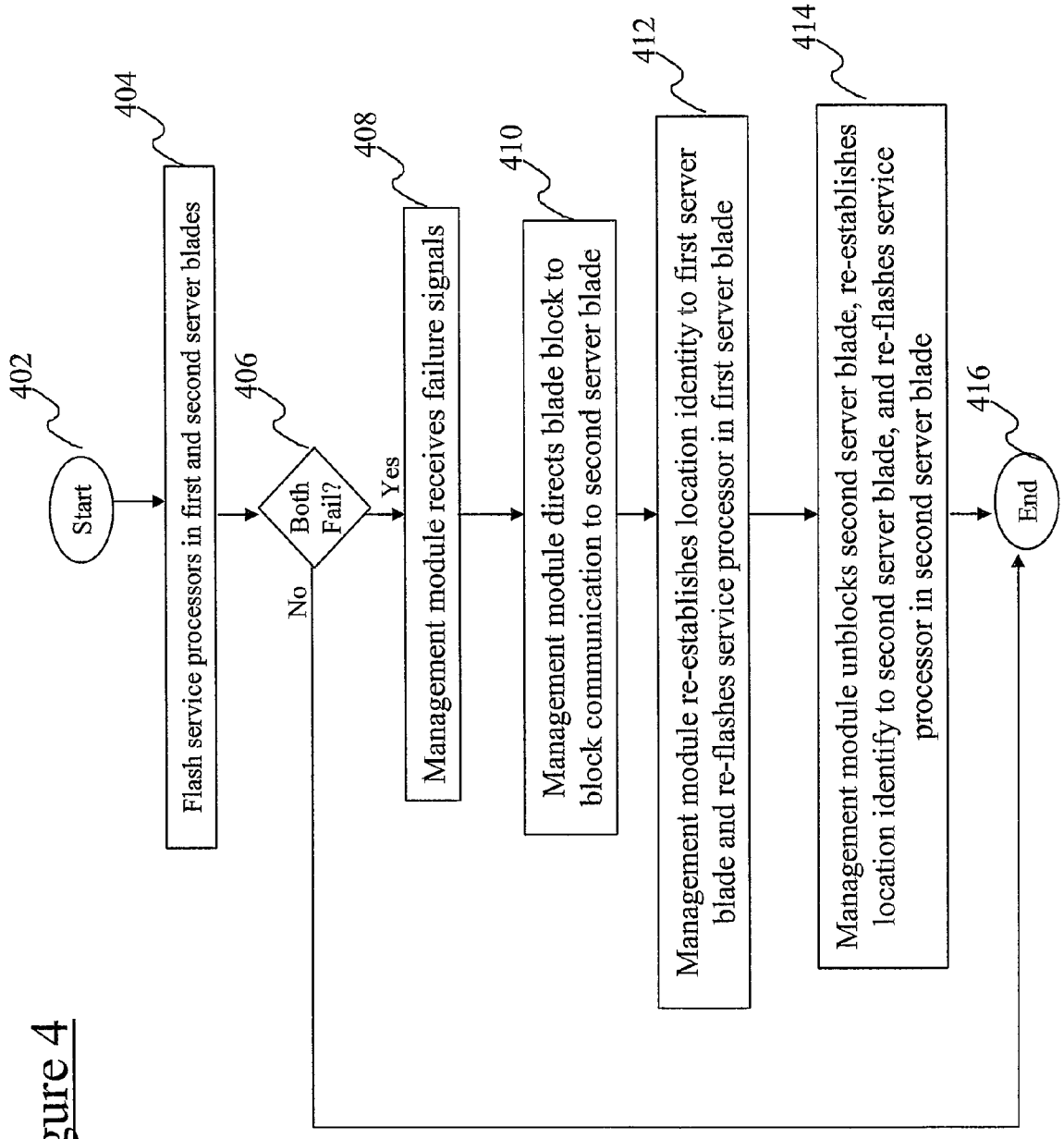
FIG. 4 is a flow-chart of steps taken to retrieve more than one lost serve blade.

With reference now to FIG. 3, there is depicted a flow-chart of steps taken in a preferred embodiment of the present invention to recover a lost server blade. Starting at initiator 302, Flash ROM in a service processor of a server blade is flashed with an update of firmware (block 304). This firmware, downloaded from the management module to the service processor, is preferably that described above in reference to FIGS. 2a-b. That is, this firmware, which is downloaded (flashed) into the flashable area of the Flash ROM, is an update of the previously stored firmware, and includes code that optimizes the operation of the associated server blade.

During the flash operation, the logical location of the server blade may become undefined until the flash operation is successfully completed. The flash operation may not successfully complete, due to reasons discussed above. If not (query block 306), the server blade transmits an error signal (block 308). This error signal is transmitted on a special address (physical wire or IP address) in the midplane between the management module and the server blade. For example, if the server chassis has slots for fourteen server blades, each having a unique address on the midplane bus, then a fifteenth address on the midplane bus is reserved for error signals indicating a failed flash operation of the Flash ROM in a server blade.

However, the management module will not know just from the error signal alone which server blade failed to flash its Flash ROM with the updated firmware. Therefore, the management module first reviews a list of locations (addresses) of all server blades identified as being part of the server chassis system (block 310). The management module then determines which server blade is "lost" (due to having its location undefined during the failed flash operation) by comparing locations on the server blade address list (of all server blades that should be on the system) with the addresses of server blades that have currently communication ability with the management module. This communication ability can be achieved by the management module by monitoring traffic to and from the server blades and using the presence detect device 232 as described above in reference to FIG. 2a. The server blade that is on the list but not communicating with the management module is deduced to be the lost server (block 312).

The management module then provides (block 314), preferably using the I²C logic 224 described in FIG. 2, the server blade its current management pathway location (physical location or IP address). This current location identity is preferably provided by translating the current location identity from the blade address list 228 shown in FIG. 2a. Now that the management module and server blade knows the restored location identity of the server blade, the management module can re-flash the Flash ROM in the server blade (block 316), and the process ends (terminator block 318).

There may be instances in which two or more server blades fail. The steps shown in FIG. 4 address a preferred method for handling this condition. While the steps are described as only two server blades failing to properly flash new firmware, the method is appropriate for any number of server blades, as described herein.

Starting with initiator block 402, the management module flashes the Flash ROMs of a first and second server blade (block 404). If they both fail (query block 406), then both server blades will be lost. One (or preferably both) of the server blades put a failure signal on the midplane bus connected to the management module, which receives the failure signal (block 408). If both the first and second server blades send a failure signal, then the management module may receive duplicate failure signals, indicating two failed flashes. Alternatively, the management module may receive only a single failure signal, for both server blades, whether both server blades or only one server blade sent the failure signal.

The management module cannot communicate to both lost server blades, due to collision problems that would occur if both server blades were at the special address at the same time. Therefore, the management module must first block out one of the server blades (block 410) using the blade blocker described in FIG. 2a. In the same manner described in FIG. 3, the management module then re-establishes a location identity for the unblocked server blade and re-flashes that server blades Flash ROM (block 412). Next, the management module directs the blade blocker to unblock the blocked server blade, the identity location for the other lost server blade is established, and its Flash ROM is re-flashed (block 414) in a same manner described above, thus ending the process (terminator block 416).

If there are more than one server blades that have been lost due to a failed flashing of firmware to the Flash ROM, then the blade blocker continues to block all but one server blade at a time as each server blade's identity location is re-established.

The present invention thus provides a reliable method and system for recovering lost server blades that have been lost due to failed flashes. By identifying the lost server blades, the updated firmware for the server blade can be re-flashed, allowing the server blade to operate at maximum efficiency.

It should be understood that at least some aspects of the present invention may alternatively be implemented in a program product. Programs defining functions on the present invention can be delivered to a data storage system or a computer system via a variety of signal-bearing media, which include, without limitation, non-writable storage media (e.g., CD-ROM), writable storage media (e.g., a floppy diskette, hard disk drive, read/write CD ROM, optical media), and communication media, such as computer and telephone networks including Ethernet. It should be understood, therefore in such signal-bearing media when carrying or encoding computer readable instructions that direct method functions in the present invention, represent alternative embodiments of the present invention. Further, it is understood that the present invention may be implemented by a system having means in the form of hardware, software, or a combination of software and hardware as described herein or their equivalent.

While the invention has been particularly shown and described with reference to a preferred embodiment, it will be understood by those skilled in the art that various changes in form and detail may be made therein without departing from the spirit and scope of the invention.

What is claimed is:

1. A system comprising:
   a management module;
   a plurality of processors;
   a management pathway coupling the management module to the plurality of data processing systems;
   a list of reserved management pathway locations that are reserved for the plurality of data processing systems on the management pathway;
   a presence detect device coupled to the management pathway, wherein if a download of computer code to a first data processing system in the plurality of data processing systems fails and causes a management pathway location for the first data processing system to become undefined by the first data processing system, then the presence detect device detects a failure signal from the first data processing system on a special address on the management pathway, thus resulting in the management module comparing the list of reserved management pathway locations with locations of data processing units that are currently active on the management pathway to restore a management pathway location to the first data processing unit;
   a control logic, which is compliant with an I²C bus specification, for restoring the management pathway location to the first data processing system; and
   a blocker for blocking communication from the management module to a second data processing system that has failed to download software, wherein the first data processing unit can have its management pathway location restored while the second data processing system is blocked, and the second data processing system can subsequently have its management pathway location restored after unblocking the blocker.

2. The system of claim 1, further comprising:
   a service processor in the first data processing unit; and
   a flash memory in the service processor in the first data processing unit, wherein the computer code is a code update being flashed from the management module to the flash memory.

3. The system of claim 1, wherein the plurality of data processing units are server blades in a server chassis.

* * * * *